(12) United States Patent
Liao

(10) Patent No.: US 11,533,541 B2
(45) Date of Patent: Dec. 20, 2022

(54) VIDEO ACCESS METHODS AND APPARATUSES, CLIENT, TERMINAL, SERVER AND MEMORY MEDIUM

(71) Applicant: BEIJING MICROLIVE VISION TECHNOLOGY CO., LTD, Beijing (CN)

(72) Inventor: Zhi Liao, Beijing (CN)

(73) Assignee: BEIJING MICROLIVE VISION TECHNOLOGY CO. LTD., Beijing (CN)

( * ) Notice: Subject to any disclaimer, the term of this patent is extended or adjusted under 35 U.S.C. 154(b) by 0 days.

(21) Appl. No.: 16/944,652

(22) Filed: Jul. 31, 2020

(65) Prior Publication Data

US 2020/0366963 A1 Nov. 19, 2020

Related U.S. Application Data

(63) Continuation of application No. PCT/CN2018/124747, filed on Dec. 28, 2018.

(30) Foreign Application Priority Data

Jun. 29, 2018 (CN) .......................... 201810697922.0

(51) Int. Cl.
*H04N 5/445* (2011.01)
*H04N 21/472* (2011.01)
(Continued)

(52) U.S. Cl.
CPC ... *H04N 21/47202* (2013.01); *H04N 21/2187* (2013.01); *H04N 21/4312* (2013.01)

(58) Field of Classification Search
CPC ........... H04N 21/2743; H04N 21/2387; H04N 21/25891; H04N 21/23406;
(Continued)

(56) References Cited

U.S. PATENT DOCUMENTS 9,201,967 B1 * 12/2015 Zhao .................... G06F 16/9535
10,104,427 B1 * 10/2018 Zabetian .............. H04N 21/435
(Continued)

FOREIGN PATENT DOCUMENTS

CN 103986767 A 8/2014
CN 103986787 A 8/2014
(Continued)

OTHER PUBLICATIONS

International Patent Application No. PCT/CN2018/124747; Int'l Search Report; dated Mar. 21, 2019; 13 pages.

*Primary Examiner* — Annan Q Shang
(74) *Attorney, Agent, or Firm* — BakerHostetler

(57) ABSTRACT

Disclosed are video access methods and apparatuses, a client, a terminal, a server and a memory medium, wherein the method comprises: receiving entrance presentation data of a video-updated user, wherein the video-updated user includes a user who has a video updated among followed users; displaying an entrance presentation bar on the current terminal interface, and presenting at least one video access entrance in the entrance presentation bar based on the entrance presentation data; and displaying, responsive to a client user's preset operation on any video access entrance in the entrance presentation bar, a video play page corresponding to the preset operation.

16 Claims, 9 Drawing Sheets

(51) Int. Cl.
*H04N 21/2187* (2011.01)
*H04N 21/431* (2011.01)

(58) Field of Classification Search
CPC ......... H04N 21/6125; H04N 21/43615; H04N 21/64322; H04N 21/47202; H04N 21/2543; H04N 21/84; H04N 21/6557; H04N 21/812; H04N 21/2187; H04N 21/4312; H04N 21/44226; H04N 21/431; H04N 21/858
See application file for complete search history.

(56) References Cited

U.S. PATENT DOCUMENTS

| | | | |
|---|---|---|---|
| 10,271,079 B1* | 4/2019 | Woschank | H04N 21/4788 |
| 10,373,176 B1* | 8/2019 | Wei | H04N 21/26233 |
| 10,706,843 B1* | 7/2020 | Elangovan | G10L 15/22 |
| 2007/0143493 A1 | 6/2007 | Mullig et al. | |
| 2009/0133071 A1* | 5/2009 | Sakai | H04N 21/251 725/46 |
| 2010/0083137 A1* | 4/2010 | Shin | H04N 7/147 726/28 |
| 2013/0330055 A1* | 12/2013 | Zimmermann | H04N 21/2743 386/240 |
| 2014/0148135 A1* | 5/2014 | Haney | G01S 19/03 455/414.1 |
| 2015/0143389 A1 | 5/2015 | Lee | |
| 2015/0146216 A1* | 5/2015 | Krauhausen | G01B 11/24 356/612 |
| 2015/0278534 A1* | 10/2015 | Thiyagarajan | G06F 21/84 726/28 |
| 2016/0011726 A1 | 1/2016 | Felt | |
| 2016/0080817 A1* | 3/2016 | Chai | G06F 3/0482 725/43 |
| 2016/0156957 A1* | 6/2016 | Yun | H04N 21/4415 725/14 |
| 2016/0205431 A1* | 7/2016 | Avedissian | H04N 21/4312 725/37 |
| 2016/0246452 A1* | 8/2016 | Bockhold | G06F 3/0488 |
| 2016/0323364 A1 | 11/2016 | Xu et al. | |
| 2016/0366203 A1* | 12/2016 | Blong | H04L 51/32 |
| 2016/0381427 A1* | 12/2016 | Taylor | H04N 21/23424 725/13 |
| 2017/0006322 A1* | 1/2017 | Dury | A63F 13/49 |
| 2017/0180805 A1* | 6/2017 | Tu | H04N 21/4826 |
| 2018/0032212 A1 | 2/2018 | Choi et al. | |
| 2018/0152746 A1* | 5/2018 | Lin | H04N 21/44213 |
| 2018/0219924 A1* | 8/2018 | Nagabushanam | H04L 67/10 |
| 2018/0234738 A1* | 8/2018 | Sarkar | H04L 51/18 |
| 2018/0343488 A1* | 11/2018 | Amento | H04L 65/1069 |
| 2019/0075340 A1* | 3/2019 | Hochart | H04N 21/4532 |
| 2019/0111346 A1* | 4/2019 | Payzer | H04N 21/6587 |
| 2019/0141089 A1* | 5/2019 | Loheide | H04N 21/4307 |
| 2019/0149089 A1* | 5/2019 | Xu | H02S 10/00 324/761.01 |
| 2021/0001219 A1* | 1/2021 | Paradise | A63F 13/352 |

FOREIGN PATENT DOCUMENTS

| | | |
|---|---|---|
| CN | 104135685 A | 11/2014 |
| CN | 104639721 A | 5/2015 |
| CN | 106060574 A | 10/2016 |
| CN | 106131584 A | 11/2016 |
| CN | 106302107 A | 1/2017 |
| CN | 106325667 A | 1/2017 |
| CN | 106534940 A | 3/2017 |
| CN | 107122101 A | 9/2017 |
| CN | 108881994 A | 11/2018 |
| JP | 2017-010454 | 1/2017 |
| JP | 2017-517830 A | 6/2017 |
| JP | 2019-525338 A | 9/2019 |
| WO | WO 2013/011645 A1 | 1/2013 |

\* cited by examiner

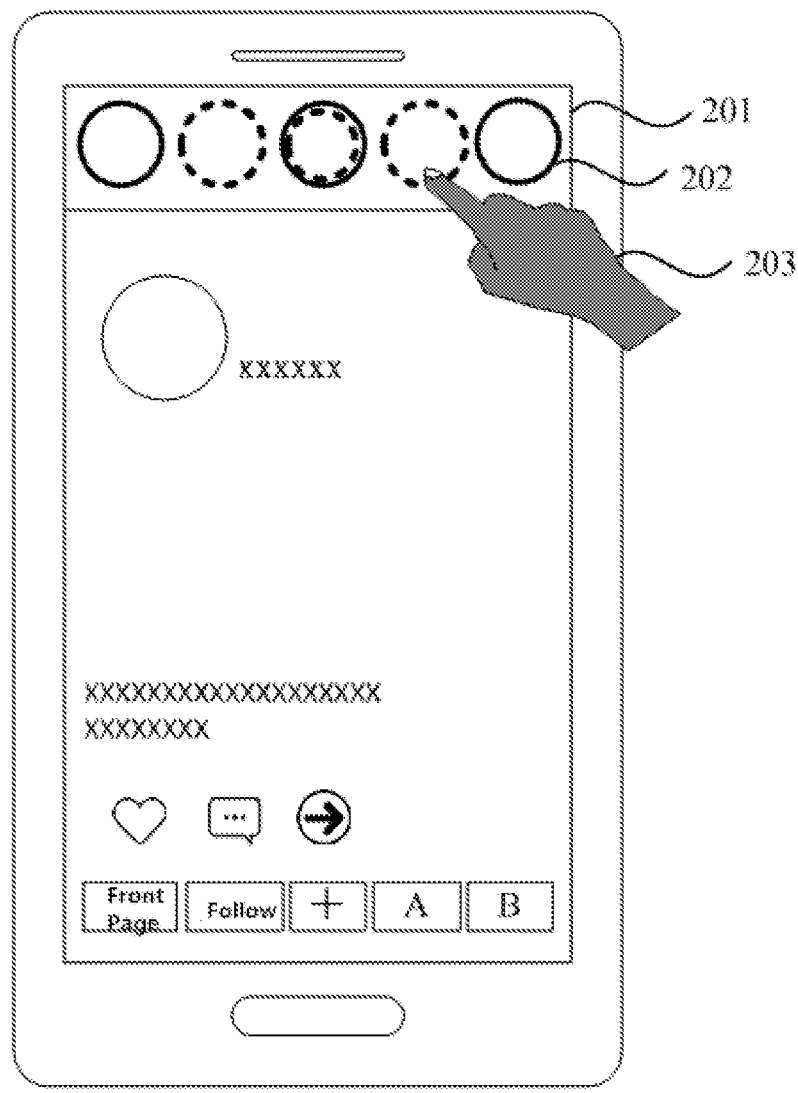

FIG. 2b determine, responsive to a video refresh request sent from a terminal, entrance presentation data of a video-updated user among the followed users, and sending the entrance presentation data to the termina  ⎯ S310 sending, responsive to a video data access request directed to any video-updated user sent by the terminal, the video data corresponding to the video data access request to the terminal  ⎯ S320

FIG. 3

VIDEO ACCESS METHODS AND APPARATUSES, CLIENT, TERMINAL, SERVER AND MEMORY MEDIUM

CROSS-REFERENCE TO RELATED APPLICATIONS

The present application is a continuation of International Patent Application No. PCT/CN2018/124747 filed on Dec. 28, 2018, which claims priority to Chinese Patent Application No. 201810697922.0, filed on Jun. 29, 2018 with the Chinese Patent Office, both of which are incorporated herein by reference in their entireties.

FIELD

Embodiments of the present disclosure generally relate to Internet technologies, and more particularly relate to video access methods and apparatuses, a client, a terminal, a server, and a memory medium.

BACKGROUND

With a relevant social video application (APP), a user may share his/her own life, view short videos in the APP, make more friends, and access various bizzar and interesting stories; besides, such an APP enables the user to follow the ID (Identity) of an account he/she likes, access updates of the account, and view short videos updated by or live broadcasts made by the account.

However, each time when the user views a live broadcast or short video posted by a followed account, he or she has to enter the ID of the followed account in the search bar of the APP, then accesses the homepage of the followed account, and enters the live room from the homepage; or he or she has to click on the control "My Follows" at the lower part of the first page of the APP; in order to enter the live room or view the short video of the followed account, he or she has to further go through layers and layers of options in the menu.

Therefore, the access path to a relevant video of the followed account is very fussy, offering a poor experience in user operations.

SUMMARY

Embodiments of the present disclosure provide video access methods and apparatuses, a client, a terminal, a server, and a memory medium so as to ameliorate the phenomena of fussy access path and complex operations occurring to a user accessing a live room or short video of a followed account.

An embodiment of the present disclosure provides a video access method applied to a terminal, the method comprising:

receiving entrance presentation data of a video-updated user, wherein the video-updated user includes a user who has a video updated among followed users;

displaying an entrance presentation bar on the current terminal interface, and presenting at least one video access entrance in the entrance presentation bar based on the entrance presentation data; and displaying, responsive to a client user's preset operation on any video access entrance in the entrance presentation bar, a video play page corresponding to the preset operation.

An embodiment of the present disclosure provides a video access method applied to a server, the method comprising:

determining, responsive to a video refresh request sent from a terminal, entrance presentation data of a video-updated user among followed users, and sending the entrance presentation data to the terminal; and sending, responsive to a video data access request directed to any video-updated user as sent by the terminal, video data corresponding to the video data access request to the terminal, wherein the video data access request is acquired by the terminal through a preset operation on the at least one video access entrance presented in the entrance presentation bar displayed on the current terminal interface, and the at least one video access entrance is presented in the entrance presentation bar based on the entrance presentation data.

An embodiment of the present disclosure further provides a client configured to a terminal, the client comprising:

a presentation data receiving module configured for receiving entrance presentation data of a video-updated user, wherein the video-updated user includes a user who has a video updated among followed users;

an entrance presenting module configured for displaying an entrance presentation bar on the current terminal interface, and presenting at least one video access entrance in the entrance presentation bar based on the entrance presentation data; and a video playing module configured for displaying, responsive to a client user's preset operation on any video access entrance in the entrance presentation bar, a video play page corresponding to the preset operation.

An embodiment of the present disclosure further provides a video access apparatus configured to a server, the apparatus comprising:

a presentation data sending module configured for determining, responsive to a video refresh request sent from a terminal, entrance presentation data of a video-updated user among followed users, and sending the entrance presentation data to the terminal; and a video data sending module configured for sending, responsive to a video data access request directed to any video-updated user as sent by the terminal, video data corresponding to the video data access request to the terminal, wherein the video data access request is acquired by the terminal through a preset operation on the at least one video access entrance presented in the entrance presentation bar displayed on the current terminal interface, and the at least one video access entrance is presented in the entrance presentation bar based on the entrance presentation data.

An embodiment of the present disclosure further provides a terminal, the terminal comprising:

one or more processors;

a memory configured for storing one or more programs, wherein when the one or more programs are executed by the one or more processors, the one or more processors are caused to implement the video access method applied to a the terminal in the embodiments of the present disclosure.

An embodiment of the present disclosure further provides a server, the server comprising:

one or more processors;

a memory configured for storing one or more programs, wherein when the one or more programs are executed by the one or more processors, the one or more processors are caused to implement the video access method applied to the server in the embodiments of the present disclosure.

An embodiment of the present disclosure further provides a computer-readable memory medium on which a computer program is stored, wherein the program, when being executed by the processor, implements the video access method applied to a terminal in the embodiments of the present disclosure.

An embodiment of the present disclosure further provides a computer-readable memory medium on which a computer program is stored, wherein the program, when being executed by the processor, implements the video access method applied to a server in the embodiments of the present disclosure.

BRIEF DESCRIPTION OF THE DRAWINGS

FIG. 2b is a schematic diagram of the entrance presentation and the video access entrance on the terminal interface when the video access entrance in the second embodiment is at least one of a short video access entrance and a live broadcast access entrance or the video access entrance in the second embodiment is at least one of a long video access entrance and a live broadcast access entrance;

FIG. 3 is a flow diagram of a video access method in a third embodiment of the present disclosure;

DETAILED DESCRIPTION OF EMBODIMENTS

Figure 1A:
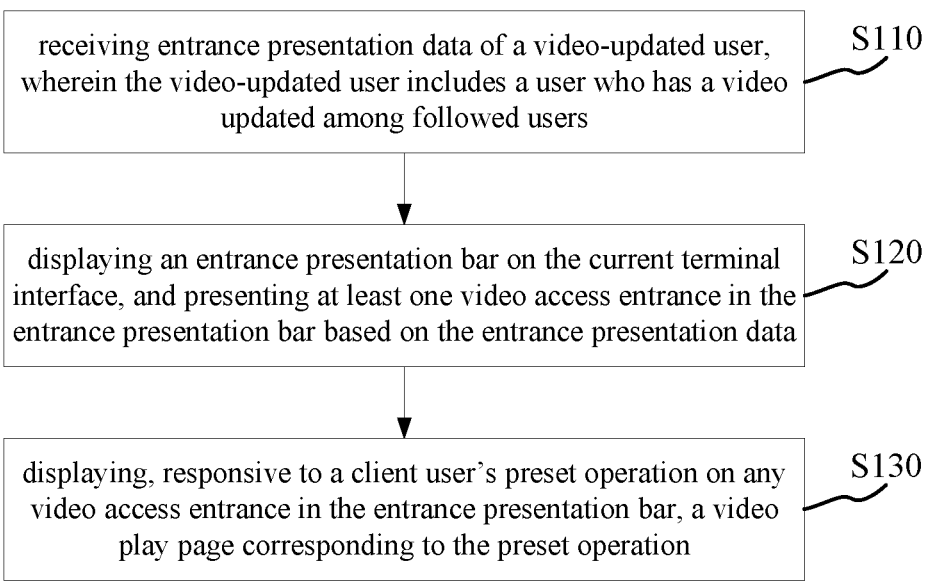
FIG. 1a is a flow diagram of a video access method in the first embodiment of the present disclosure.

Hereinafter, the present disclosure will be described in further detail with reference to the accompanying drawings and the embodiments. It may be understood that the preferred embodiments described herein are only for illustrating, rather than limiting the present disclosure. Additionally, it needs to be further noted that for the ease of depiction, only those parts related to the present disclosure, rather than the whole structure, are illustrated in the drawings.

Embodiment 1

FIG. 1a shows a flow chart of a video access method provided according to the first embodiment of the present disclosure. This embodiment is applicable to a scenario in which a user views an updated video of a followed user, wherein the method may be executed by a client, which client may be implemented by at least one of software and hardware and may be configured on any terminal with a network communication function, e.g., a smart phone, a tablet computer, etc. As shown in FIG. 1a, the video access method provided in this embodiment of the present disclosure comprises: step S110, step S120, and step 130.

Step S110: receiving entrance presentation data of a video-updated user.

wherein the video-updated user includes a user who has a video updated among followed users;

In an embodiment of the present disclosure, a live broadcast or a short video may be viewed in the client application; therefore, the updated video includes a live broadcast or an updated short video. The client includes a plurality of client interfaces, e.g., a front-page client interface, a follow page client interface, and other client interfaces.

Figure 1B:
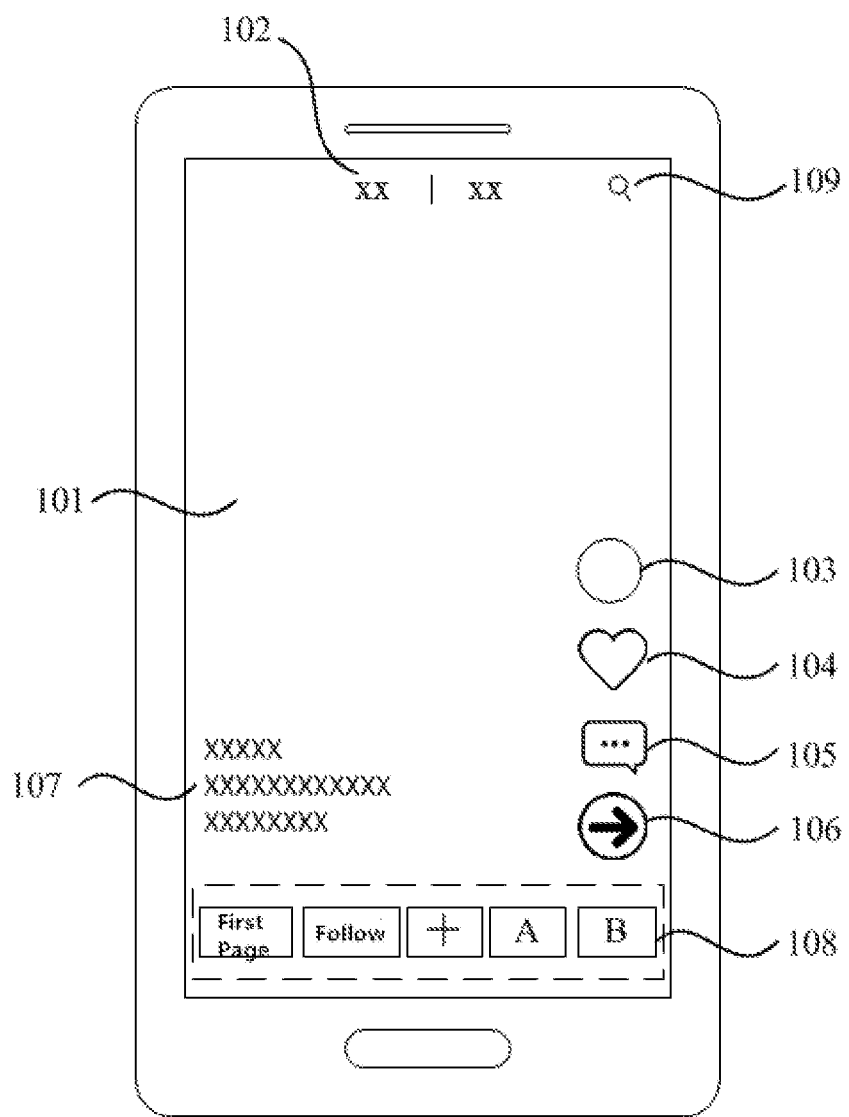
FIG. 1b is a schematic diagram of a First Page client interface in the first embodiment of the present disclosure.

FIG. 1b is a schematic diagram of a front-page client interface according to the first embodiment of the present disclosure. Refer to FIG. 1b. On the terminal screen interface shown in FIG. 1b, the interface zone indicated by 101 on the front-page client interface is the short video interface content (i.e., information stream content) pushed by the server, wherein an information stream refers to an information element existent in a certain manner (usually arranged in a time order). 102~109 are controls on 101. The switch control indicated by 102 is configured for switching between recommendation manners of the short-video contents presented on the front-page client interface, e.g., pushing based on click-through heats or distances between the video uploading places and the client user; the search control 109 is for entering contents such as user account, video keyword, and topic of interest, etc. so as to find the target video content. 103 represents the profile picture of the user by whom the short video played on the current interface is uploaded, wherein by clicking the profile picture, the client user may enter the homepage of the uploading user; after the client user views the short video, he or she may click on the control 104 to mark the viewed short video as his/her like; by clicking the control 105, the client user may view the comments on the short video from other users and may also post his/her own comments on that short video; by clicking the control 106, the client user may share the short video to other users or to friends on other platforms; while 107 is the label or a simple description of the currently played short video.

To jump from the current client interface to another client interface, an interface jump control 108 is configured on the client interface; when it is needed to jump from the front-page client interface to another client interface of the client application, the interface jump control 108 provided on the client interface may be triggered to realize jumping from the current client interface to another client interface of the client application. In one embodiment, the client application includes 4 client interfaces, which are the front-page client interface, follow page client interface, client A interface, and client B interface, respectively, the jump control 108 on the front-page client interface may include a series of page jump controls, which are a front-page control, a follow page control, control A and control B, respectively, wherein the page jump controls may be associated with the client interfaces. When the user triggers the follow page control on the front-page client interface, the client may display, responsive to the client user's trigger operation, the follow page client interface associated with the follow page control on the terminal screen. Via the control "+" symbol in the control 108, a video capture interface may be accessed, such that the user may capture, edit and post his/her own short video or make a live broadcast.

Figure 1C:
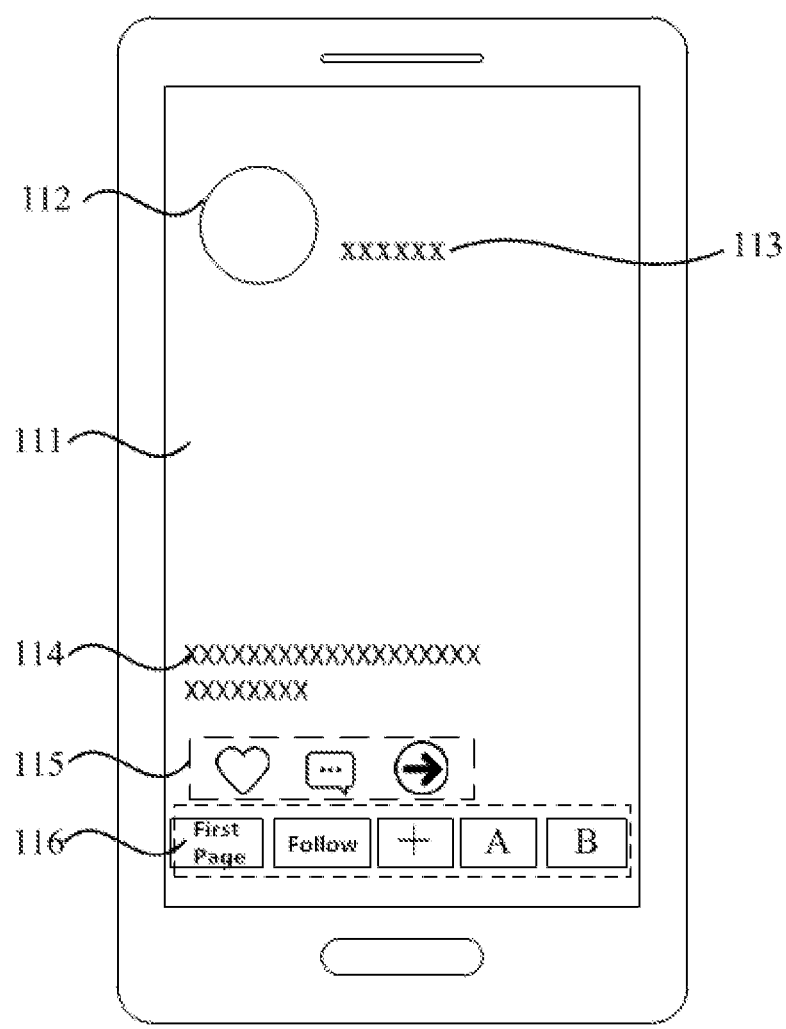
FIG. 1c is a schematic diagram of a Follow Page client interface in the first embodiment of the present disclosure.

The follow page client interface is shown in FIG. 1c, wherein 111 denotes the followed user short video interface currently presented on the follow page client interface; 112 denotes the profile picture of the user who uploads the short video currently presented on the follow page client interface; 113 denotes the time when the user uploads the short video; 114 denotes descriptive content such as the label of the short video; 115 is an interaction control, which may implement operations such as liking, commenting or forwarding the current short video; 116 denotes an interface jump control, identical to 108 in FIG. *b*.

On the current user interface, after the user triggers a refresh operation, the terminal will receive the entrance presentation data of the video-updating user sent by the server. The video updating user refers to the user, among the users followed by the current client user, who is determined by the server is making a live broadcast or has updated the short video.

Step S120: displaying an entrance presentation bar on the current terminal interface, and presenting at least one video access entrance in the entrance presentation bar based on the entrance presentation data.

When the terminal receives the entrance presentation data, an entrance presentation bar is presented on the client interface of the current terminal, wherein the presentation bar may be in a form of dropdown menu, or in a form of pop-out side bar. Specific presentation forms are not limited in this embodiment.

In an embodiment, the entrance presentation bar in a skylight form is displayed above the current terminal interface. In an embodiment of the present disclosure, the width and pattern of the presentation bar may be configured based on the size of the terminal interface and the pattern of the content presented in the presentation bar; there are no specific limitations on the form of the presentation bar.

Figure 1D:
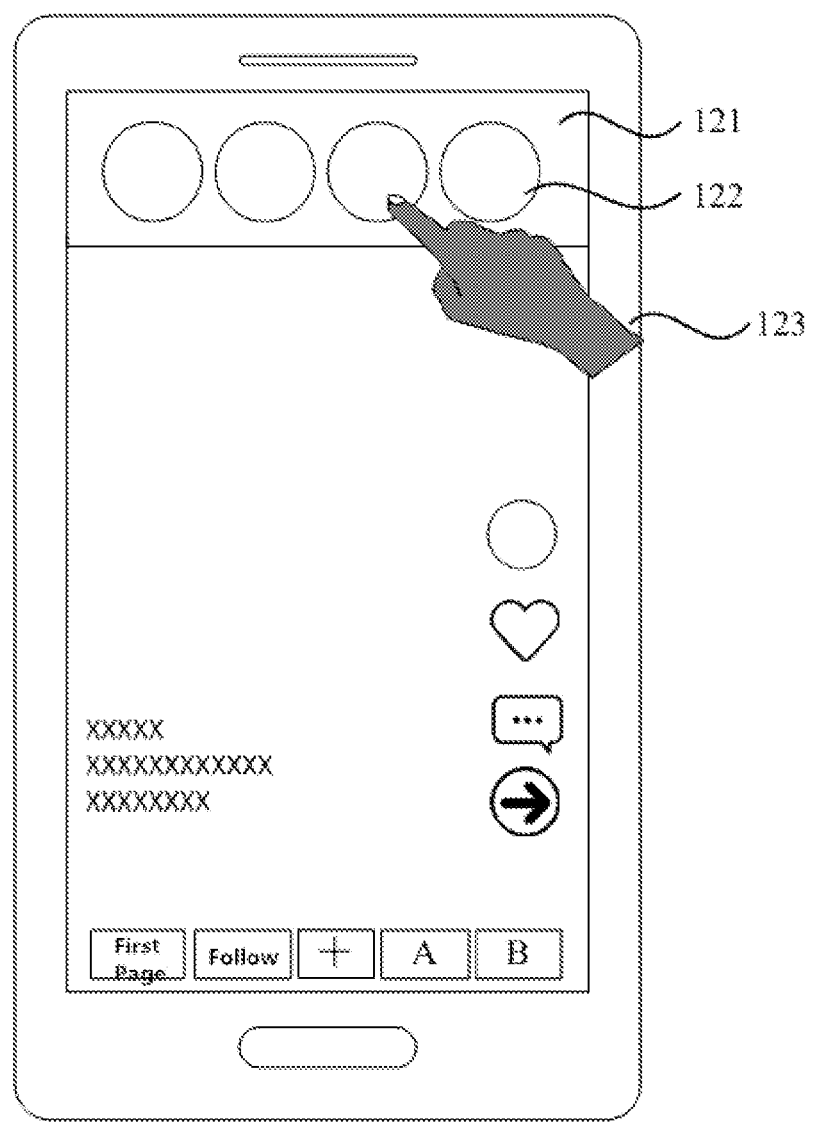
FIG. 1d is a schematic diagram of entrance presentation and video access entrance on a terminal interface in the first embodiment of the present disclosure.

In an embodiment of the present disclosure, the entrance presentation data at least include profile pictures of the video-updated users, wherein the profile picture of each video-updated user is the video access entrance. With the front-page client interface as the current user interface, FIG. 1*d* is a schematic diagram of entrance presentation and video access entrance on the terminal interface; as shown in FIG. 1*d*, 121 is a presentation bar presented above the current terminal interface, and 122 is a video access entrance in the presentation bar, which may be the profile picture of the user who has a video updated. The client user 123 may select any video access entrance to access the corresponding video interface.

In an embodiment, the profile pictures presented in the presentation bar may be arranged by time order, wherein the profile pictures of those video-updated users whose video update time is closest to the video refreshing time are presented in the presentation bar in priority. When the user slides through the presentation bar, profile pictures of more video-updated users may be presented in the presentation bar.

Step S130: displaying, responsive to a client user's preset operation on any video access entrance in the entrance presentation bar, a video play page corresponding to the preset operation.

Particularly, the preset operation refers to a touch operation of the client user on a response zone corresponding to the access entrance on the screen, e.g., click, long-press, etc. When the user clicks a certain access entrance in the presentation bar, the terminal may send, to the server, a video data request corresponding to the access entrance; after receiving the video data request, the server parses the request, determines target video data, and then send the target video data to the terminal. In this way, the current terminal interface will jump to the video interface corresponding to the access entrance, wherein the video interface may be a live broadcast or an updated recorded short video. The client may receive the video data via a wireless network and play the video data on the current terminal interface. The wireless network may adopt WiFi (Wireless Fidelity), 3G, 4G or 5G network, etc.

By means of receiving and presenting the entrance presentation data of the video-updated user, displaying the entrance presentation bar on the terminal interface, and displaying, responsive to a client user's preset operation on any video access entrance in the entrance presentation bar, a video play page corresponding to the preset operation, the video access method provided in the embodiments of the present disclosure provides an access entrance enabling the user to quickly access the video of the followed user, and ameliorates the phenomena of fussy access path and complex operations occurring to a user accessing a live room or short video of a followed account, such that the user may directly access, on the current terminal interface, the video interface of the video-updated user among the followed users.

Embodiment 2

Figure 2A:
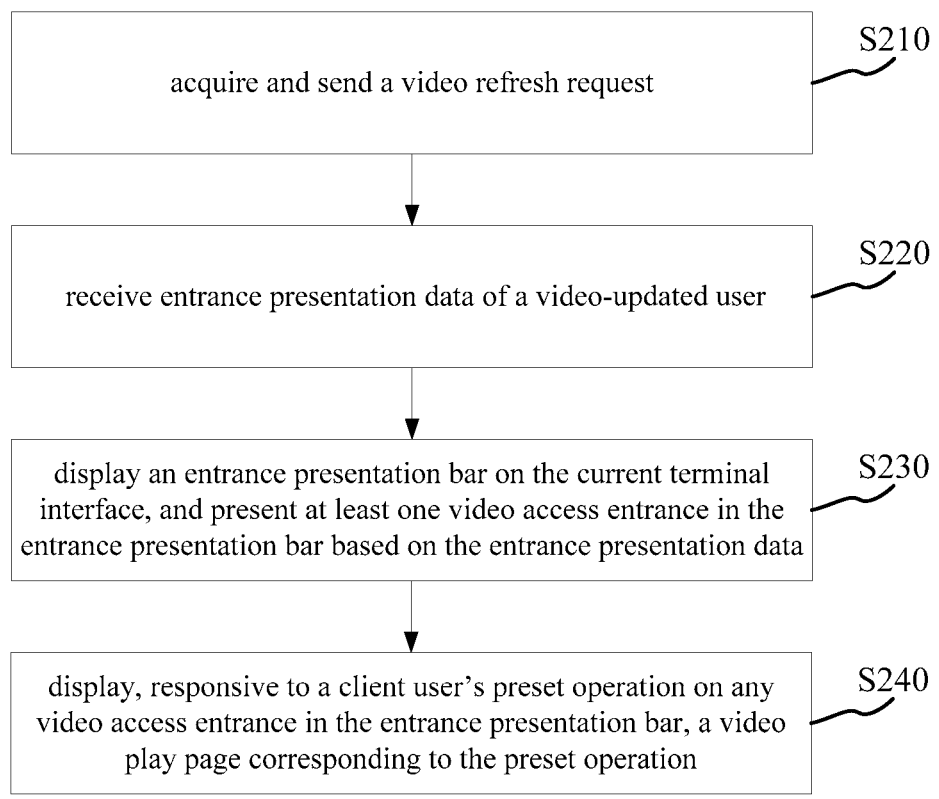
FIG. 2a is a flow diagram of a video access method in a second embodiment of the present disclosure.

FIG. 2*a* is a flow diagram of a video access method in a second embodiment of the present disclosure. As shown in FIG. 2*a*, the method comprises step S210 to step S240.

Step S210: acquiring and sending a video refresh request.

Particularly, the video refresh request is generated based on the client user's dropdown operation on the current terminal interface, for indicating acquisition of the entrance presentation data.

When the client user wants to view the live broadcast or short video of the followed user, he or she may drop down the current client interface on the front-page client interface or on the follow page client interface to trigger a video refresh operation. After the terminal receives the refresh instruction, it sends the instruction to the server; then the server determines whether there exist a user, among the users currently followed by the client user, who is making a live broadcast or has updated a short video; when there exists a followed user who is making a live broadcast or has updated the short video, the entrance presentation data of the video-updated user are sent to the terminal. When receiving the corresponding entrance presentation data, the terminal may further carry out the presentation.

Step S220: receiving entrance presentation data of a video-updated user.

Particularly, the video-updated user includes a user who has a video updated among followed users;

Step S230: displaying an entrance presentation bar on the current terminal interface, and presenting at least one video access entrance in the entrance presentation bar based on the entrance presentation data.

In an embodiment, when the video access entrance is a live broadcast access entrance, displaying the entrance presentation bar on the current terminal interface correspondingly comprises: displaying the entrance presentation bar on the front page, and displaying at least one live broadcast access entrance in the form of profile picture in the entrance presentation bar. In other words, the live video access entrance of a followed user who is making a live broadcast is presented on the front-page client interface. Then, the client user may directly and quickly access the live room of the user of his/her interest. FIG. 1*d* shows the schematic diagram of the terminal interface.

In an embodiment, the video access entrance is at least one of the short video access entrance and the live broadcast access entrance, or the video access entrance is at least one of the long video access entrance and the live broadcast access entrance; correspondingly, displaying the entrance presentation bar on the current terminal interface comprises: displaying the entrance display bar on a follow page, and displaying (i) at least one of the short video access entrance and the live broadcast access entrance or (ii) at least one of the long video access entrance and the live broadcast access entrance, in the form of profile picture in the entrance presentation bar, wherein one of the profile picture of the short video access entrance and the profile picture of the long video access entrance is discriminated from the profile picture of the live broadcast based on a preset configurations. Particularly, the preset configuration may refer to applying different colors to the frames of the profile picture of the short/long video access entrance and the live broadcast access entrance to discriminate, or adding different marks to the profile pictures to discriminate. Particularly, the long video refers to a video type whose time length is longer than a short video, wherein the long video may also be a story video, a time length of which can express the video content and plot more completely.

In other words, video access entrances of the users, among the followed users, who are making a living broadcast or who have updated the short video or long video are simultaneously presented on the follow page client interface. FIG. 2b is a schematic diagram of entrance presentation and video access entrances on the terminal interface when the video access entrance in the second embodiment is at least one of a short video access entrance and a live broadcast access entrance or when the video access entrance is at least one of a long video access entrance and a live broadcast access entrance. As shown in FIG. 2b, video access entrances 202, which may be profile pictures of video-updated users, are presented in a presentation bar 201 above the follow page client interface. In an embodiment, FIG. 2b presents 5 video access entrances 202, wherein the access entrances represented by full lines are live broadcast access entrances; the access entrances represented by dotted lines are short video access entrances or long video access entrances; meanwhile, the access entrance represented by both full line and dotted line indicate that a certain followed user is making a live broadcast and has a short video or a long video updated. It needs to be noted that the dotted lines and full lines are only different expression forms. In actual client interfaces, different access entrances may be discriminated with different expression forms, e.g., different categories of access entrances may be represented by different colors and symbols. The client user 203 may select any video access entrance to access the corresponding video interface.

Step S240: displaying, responsive to a client user's preset operation on any video access entrance in the entrance presentation bar, a video play page corresponding to the preset operation.

By clicking a certain video access entrance, the user may access the corresponding video play page. In an embodiment, when a certain profile picture clicked by the user serves as both a short video access entrance and a live broadcast access entrance, then the user accesses the live room of the followed user in priority to display the live broadcast interface. In an embodiment, the touch duration between the client user and the profile picture may also be identified; in the case of short touch, the client user accesses the live room; in the case of long touch, the user accesses the short video play interface.

By means of receiving and presenting the entrance presentation data of the video-updated user, displaying the entrance presentation bar and the live broadcast access entrance of followed users on the front-page client interface, displaying the presentation bar and the live broadcast entrance and short video entrance of the followed users, and displaying, responsive to the client user's preset operation on any video access entrance in the entrance presentation bar, a video play page corresponding to the preset operation, the video access method provided in this embodiment of the present disclosure provides an access entrance enabling the client user to quickly access the video of a followed user, and ameliorates the phenomena of fussy access path and complex operations occurring to a user accessing a live room or short video of a followed account, such that the user may directly access, on different current terminal interfaces, the video interface of the video-updated user among the followed users.

Embodiment 3

FIG. 3 is a flow diagram of a video access method in a third embodiment of the present disclosure. This embodiment is applicable to a scenario in which a user views a video updated by a followed user, wherein the method may be executed by a video access apparatus configurable on any server with a network communication function. As shown in FIG. 3, the video access method provided in this embodiment of the present disclosure comprises: step S310 and step S320.

Step S310: determining, responsive to a video refresh request sent from a terminal, entrance presentation data of a video-updated user among the followed users, and sending the entrance presentation data to the terminal.

In this embodiment, the server has different data interfaces, e.g., an information stream (short video) interface and a live broadcast data interface; when the user wants to view the live broadcast or short video of a followed user, he or she may drop down the current client interface on the front-page client interface or on the follow page client interface to trigger a video refresh operation. After receiving a furbish instruction, the terminal sends the instruction to the server; then the server determines, via different data interfaces, whether there exist a user, among those currently followed by the client user, who is making a live broadcast or has a short video updated; when there exists a followed user who is making a live broadcast or has a short video updated, the entrance presentation data of the video-updated user are sent to the terminal. When receiving the corresponding entrance presentation data, the terminal further carries out the presentation.

Step S320: sending, responsive to a video data access request directed to any video-updated user sent by the terminal, the video data corresponding to the video data access request to the terminal.

Particularly, the video data access request is acquired by the terminal through a preset operation on the at least one video access entrance presented in the entrance presentation bar displayed on the current terminal interface, and the at least one video access entrance is presented in the entrance presentation bar based on the entrance presentation data.

When the terminal receives the entrance presentation data of the determined video-updated user among the followed users, the terminal interface will display a presentation bar for presenting the entrance presentation data; when the user clicks a certain access entrance in the presentation bar, the terminal may send, to a server, a video data request corresponding to the access entrance; after receiving the video data request, the server parses the request, determines target video data, and then sends the target video data to the terminal via the data entrance where the target video data are located. In this way, the current terminal page will jump to the video interface corresponding to the access entrance, wherein the video interface may be a live broadcast or an updated recorded short video.

In an embodiment, if no video-updated users exist in the followed users, information of no need to present the video access entrance is returned to the terminal. Then, the presentation bar and the entrance presentation data will not be displayed on the terminal interface.

By means of determining, responsive to a video refresh request sent from a terminal, whether a user among the followed users has a video updated, and sending the entrance presentation data of the video-updated user to the terminal, and sending, in response to the video data access request directed to any video-updated user sent by the terminal, the video data corresponding to the video data access request to the terminal, this embodiment of the present disclosure ameliorates the phenomena of fussy access path and complex operations occurring to a user accessing a live room or short video of a followed account, such that the user may directly access, at the current terminal interface, the video interface of the video-updated user among the followed users.

Embodiment 4

Figure 4:
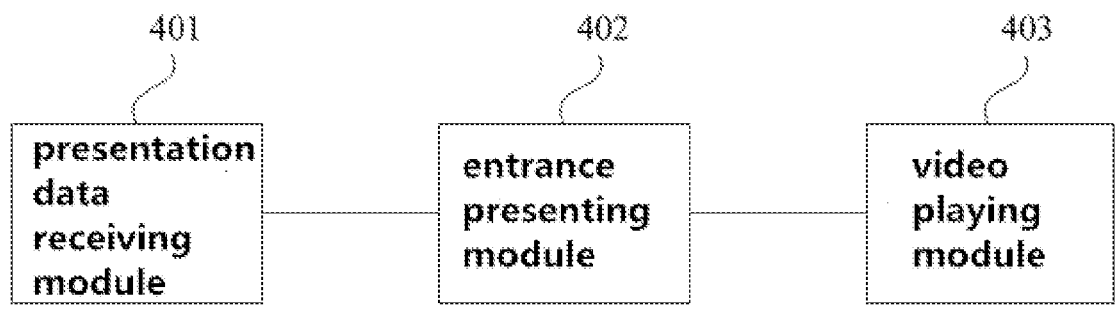
FIG. 4 is a structural schematic diagram of a client in the fourth embodiment of the present disclosure.

FIG. 4 shows a structural schematic diagram of a client provided according to the fourth embodiment of the present disclosure. This embodiment is applicable to a scenario in which a client user views an updated video of a user followed by him or her, wherein the client may be implemented by at least one of software and hardware and may be configured on any terminal with a network communication function, e.g., a smart phone, a tablet computer, etc.

As shown in FIG. 4, the client provided in the embodiments of the present disclosure comprises: a presentation data receiving module 401, an entrance presenting module 402, and a video playing module 403, wherein:

the presentation data receiving module 401 is configured for receiving entrance presentation data of a video-updated user, wherein the video-updated user includes a user who has a video updated among followed users; the entrance presenting module 402 is configured for displaying an entrance presentation bar on the current terminal interface, and presenting at least one video access entrance in the entrance presentation bar based on the entrance presentation data; and the video playing module 403 is configured for displaying, responsive to a client user's preset operation on any video access entrance in the entrance presentation bar, a video play page corresponding to the preset operation.

By means of receiving and presenting the entrance presentation data of the video-updated user and displaying the entrance presentation bar on the terminal interface, and displaying, responsive to a client user's preset operation on any video access entrance in the entrance presentation bar, a video play page corresponding to the preset operation, this embodiment of the present disclosure provides an access entrance enabling the user to quickly access the video of a followed user, which ameliorates the phenomena of fussy access path and complex operations occurring to a user accessing a live room or short video of a followed account, such that the user may directly access, on the current terminal interface, the video interface of the video-updated user among the followed users.

In an embodiment, the entrance presenting module 402 is configured for displaying the entrance presentation bar in a skylight form above the current terminal interface.

In an embodiment of the present disclosure, the entrance presentation data at least include the profile picture of the video-updated user.

In an embodiment, when the video access entrance is a live broadcast access entrance, the entrance presenting module 402 is correspondingly configured for: displaying the entrance presentation bar on the first page, and displaying at least one live broadcast access entrance in the form of profile picture in the entrance presentation bar.

In an embodiment, when the video access entrance is at least one of the short video access entrance and the live broadcast access entrance, the entrance presenting module 402 is correspondingly configured for: displaying the entrance display bar on a follow page, and presenting at least one of the short video access entrance and the live broadcast access entrance in the form of profile picture in the entrance presentation bar, wherein the profile pictures of the short video access entrance and the live broadcast access entrance are discriminated based on preset configurations.

In an embodiment, the client further comprises a refresh request module configured for obtaining and sending a video refresh request, wherein the video refresh request is generated based on the user's dropdown operation on the current terminal interface, for indicating acquisition of the entrance presentation data.

The client may execute the video access method applicable to a terminal provided in any embodiment of the present disclosure and offers functional modules and beneficial effects corresponding to the video access method applicable to the terminal.

Embodiment 5

Figure 5:
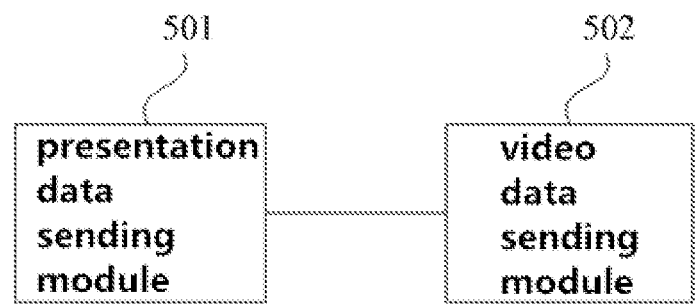
FIG. 5 is a structural schematic diagram of a video access apparatus in the fifth embodiment of the present disclosure.

FIG. 5 is a structural schematic diagram of a video access apparatus provided according to a fifth embodiment of the present disclosure, which is applicable to a scenario in which a client user views an updated video of a user followed by him or her, wherein the video access apparatus is configurable on any server with a network communication function.

As shown in FIG. 5, the video access apparatus provided by this embodiment of the present disclosure comprises a presentation data sending module 501 and a video data sending module 502, wherein:

the presentation data sending module 501 is configured for determining, responsive to a video refresh request sent from a terminal, entrance presentation data of a video-updated user among followed users, and sending the entrance presentation data to the terminal; and the video data sending module 502 is configured for sending, responsive to a video data access request directed to any video-updated user as sent by the terminal, video data corresponding to the video data access request to the terminal, wherein the video data access request is acquired by the terminal through a preset operation on the at least one video access entrance presented in the entrance presentation bar displayed on the current terminal interface, and the at least one video access entrance is presented in the entrance presentation bar based on the entrance presentation data.

By means of determining, responsive to a video refresh request sent from a terminal, entrance presentation data of a video-updated user among followed users, and sending the entrance presentation data to the terminal, and sending, in response to the video data access request directed to any video-updated user sent by the terminal, the video data corresponding to the video data access request to the terminal, this embodiment of the present disclosure ameliorates the phenomena of fussy access path and complex operations occurring to a user accessing a live room or short video of a followed account, such that the user may directly access the video interface of the video-updated user among the followed users.

In an embodiment, if no video-updated users exist in the followed users, information of no need to present the video access entrance is returned to the terminal.

The apparatus may execute the video access method applicable to a server provided in any embodiment of the present disclosure and offers functional modules and beneficial effects corresponding to the video access method applicable to a server.

Embodiment 6

Figure 6:
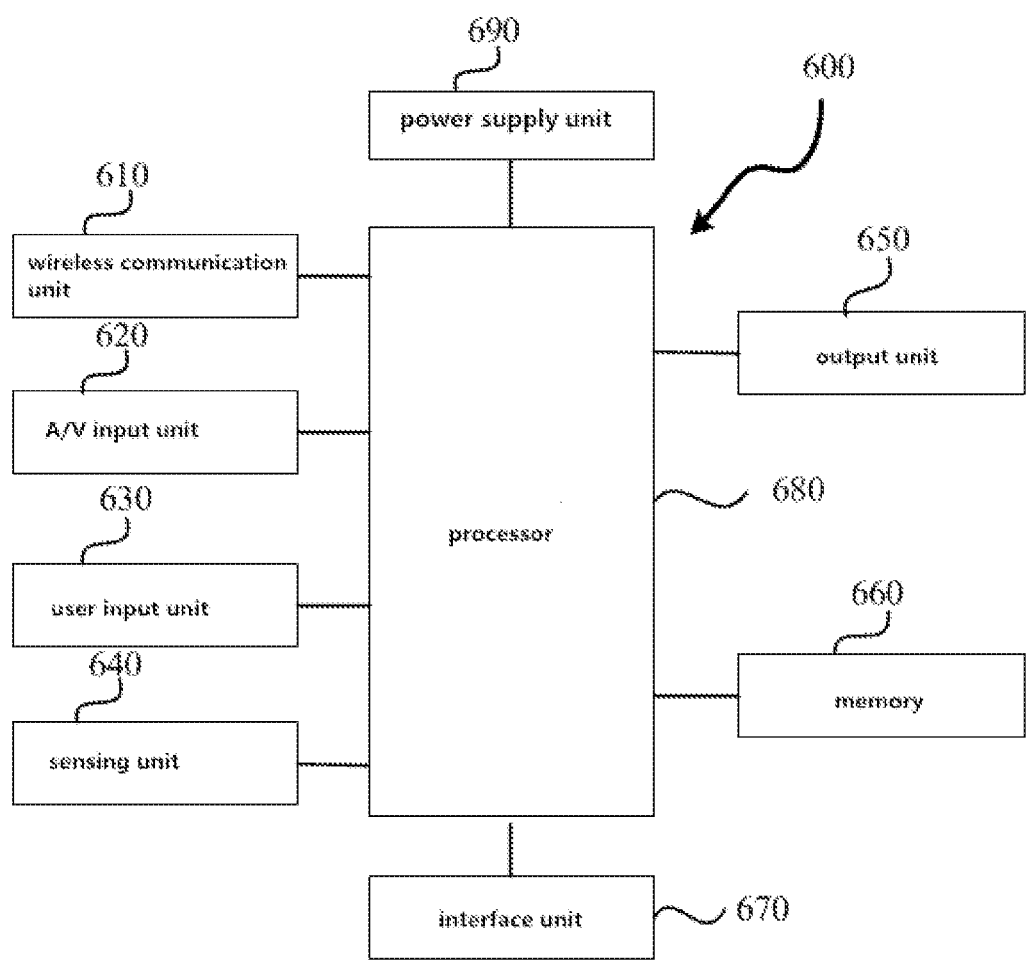
FIG. 6 is a hardware structural schematic diagram of a terminal in the sixth embodiment.

FIG. 6 is a hardware structural schematic diagram of a terminal provided in a sixth embodiment of the present disclosure. The terminal may be implemented in various forms. The terminal in this embodiment of the present disclosure may include, but are not limited to, a mobile terminal such as a mobile phone, a smart phone, a laptop computer, a digital broadcast receiver, a personal digital assistant PDA, a portable Android device (PAD), a portable media player (PMP), a navigation device, a vehicle-mount terminal, a vehicle-mount display terminal, and a vehicle-mount electronic rear mirror, etc., and a fixed terminal such as a digital television (TV), and a desk computer, etc.

As shown in FIG. 6, the terminal 600 may comprise a wireless communication unit 610, an A/V (audio/video) input unit 620, a user input unit 630, a sensing unit 640, an output unit 650, a memory 660, an interface unit 670, a processor 680, and a power supply unit 690, etc. Although FIG. 6 shows a terminal having various components, it should be understood that it is not required to implement all of the components as shown. Alternatively, more or less components may be implemented.

Particularly, the wireless communication unit 610 allows for radio communication between the terminal 600 and the wireless communication system or network. The A/V input unit 620 is configured for receiving an audio or video signal. The user input unit 630 may input data via a command generation key inputted by the user so as to control various operations of the terminal. The sending unit 640 detects the current state of the terminal 600, the location of the terminal 600, whether there is a touch input to the terminal 600 by the user, the orientation of the terminal 600, the acceleration or deceleration movement and orientation of the terminal 600, and etc., and generates commands or signals for controlling operations of the terminal 600. The interface unit 670 serves as an interface for connecting between at least one external device and the terminal 600. The output unit 650 is configured to provide an output signal by at least one of visual, audio, and tactile means. The memory 660 may store a software program for processing and controlling operations executed by the processor 680, or may temporarily store the already outputted or to-be-outputted data. The memory 660 may include at least one type of memory medium. Moreover, the terminal 600 may collaborate with a network storage device that is connected to the network to execute the storage function of the memory 660. The processor 680 generally controls the overall operations of the terminal. Additionally, the processor 680 may comprise a multimedia module for reproducing or playing back the multimedia data. The processor 680 may execute pattern recognition processing so as to identify the handwritten input or picture drawing input executed on the touch screen. The power supply unit 690 receives, under the control of the processor 680, external power or internal power, and provides power appropriate for manipulating a plurality of elements and components.

When one or more programs included in the terminal are executed by the one or more processors 680, various functional applications and data processing may be executed, e.g., the video access method applicable to the terminal as provided by an embodiment of the present disclosure, the method mainly comprising:

receiving entrance presentation data of a video-updated user, wherein the video-updated user includes a followed user who has a video updated among followed users;

displaying an entrance presentation bar on the current terminal interface, and presenting at least one video access entrance in the entrance presentation bar based on the entrance presentation data; and displaying, responsive to a user's preset operation on any video access entrance in the entrance presentation bar, a video play page corresponding to the preset operation.

Embodiment 7

Figure 7:
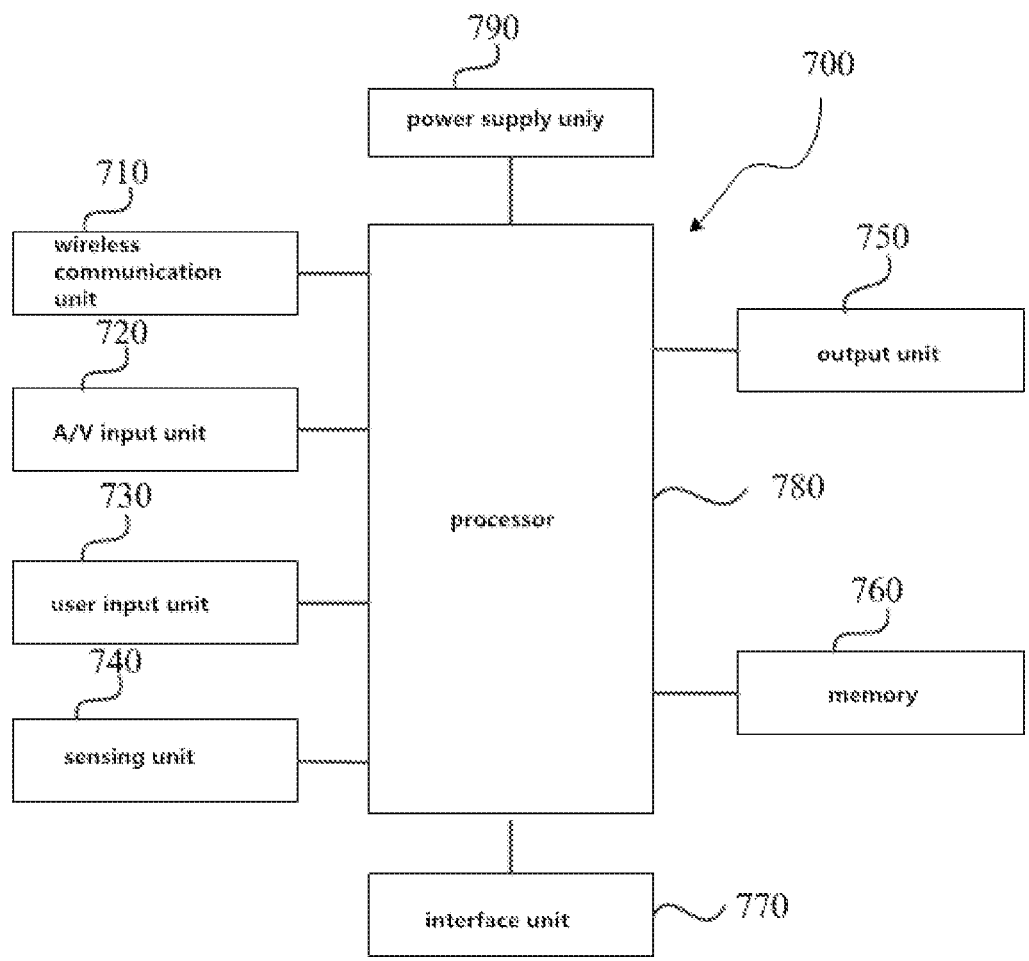
FIG. 7 is a hardware structural schematic diagram of a server in the seventh embodiment.

FIG. 7 is a hardware structural schematic diagram of a server provided in a seventh embodiment of the present disclosure. The server may be implemented in various forms. The server in the embodiments of the present disclosure may include, but are not limited to, a mobile server such as a mobile phone, a smart phone, a laptop computer, a digital broadcast receiver, a personal digital assistant PDA, a portable Android device (PAD), a portable media player (PMP), a navigation device, a vehicle-mount terminal, a vehicle-mount display terminal, and a vehicle-mount electronic rear mirror, etc., and a fixed server such as a digital television (TV), and a desk computer, etc.

As shown in FIG. 7, the server 700 may comprise a wireless communication unit 710, an A/V (audio/video) input unit 720, a user input unit 730, a sensing unit 740, an output unit 750, a memory 760, an interface unit 770, a processor 780, and a power supply unit 790, etc. Although FIG. 7 shows a server having various components, it should be understood that it is not required to implement all of the shown components. Alternatively, more or less components may be implemented.

Particularly, the wireless communication unit 710 allows for radio communication between the server 700 and the wireless communication system or network. The A/V input unit 720 is configured for receiving an audio or video signal. The user input unit 730 may input data via a command generation key inputted by the user so as to control various operations of the server. The sending unit 740 detects the current state of the server700, the location of the server 700, whether there is a touch input to the server 700 by the user, the orientation of the server 700, the acceleration or deceleration movement and orientation of the server 700, and etc., and generates commands or signals for controlling operations of the server 700. The interface unit 770 serves as an interface for connecting between at least one external device and the server 700. The output unit 750 is configured to provide an output signal by at least one of visual, audio, and tactile means. The memory 760 may store a software program for processing and controlling operations executed by the processor 780, or may temporarily store the already outputted or to-be-outputted data. The memory 760 may include at least one type of memory medium. Moreover, the server 700 may collaborate with a network storage device that is connected to the network to execute the storage function of the memory 760. The processor 780 generally controls the overall operations of the server. Additionally, the processor 780 may comprise a multimedia module for reproducing or playing back the multimedia data. The processor 780 may execute pattern recognition processing so as to identify the handwritten input or picture drawing input executed on the touch screen. The power supply unit 790 receives, under the control of the processor 780, external power or internal power, and provides power appropriate for manipulating a plurality of elements and components.

When one or more programs included in the server are executed by the one or more processors 780, various functional applications and data processing may be executed, e.g., the video access method applicable to the server as provided by an embodiment of the present disclosure, the method mainly comprising:

determining, responsive to a video refresh request sent from a terminal, entrance presentation data of a video-updated user among followed users, and sending the entrance presentation data to the terminal; and sending, responsive to a video data access request directed to any video-updated user as sent by the terminal, video data corresponding to the video data access request to the terminal, wherein the video data access request is acquired by the terminal through a preset operation on the at least one video access entrance presented in the entrance presentation bar displayed on the current terminal interface, and the at least one video access entrance is presented in the entrance presentation bar based on the entrance presentation data.

Embodiment 8

An eighth embodiment of the present disclosure further provides a computer-readable memory medium on which a computer program is stored, wherein the program, when being executed by the processor, implements the video access method applied to a terminal in the embodiments of the present disclosure, the method mainly comprising:

receiving entrance presentation data of a video-updated user, wherein the video-updated user includes a user who has a video updated among followed users;

displaying an entrance presentation bar on the current terminal interface, and presenting at least one video access entrance in the entrance presentation bar based on the entrance presentation data; and displaying, responsive to a user's preset operation on any video access entrance in the entrance presentation bar, a video play page corresponding to the preset operation.

The computer memory medium according to an embodiment of the present disclosure may adopt one computer readable medium or any combination of more computer readable mediums. The computer readable medium may be a computer readable signal medium or a computer readable memory medium. The computer-readable memory medium, for example, may be, but not limited to, an electrical, magnetic, optical, electromagnetic, infrared, or semiconductor system, apparatus or device, or any combination thereof. More specific examples (a non-exhaustive list) of the computer-readable memory medium may include an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination of the above. In the present disclosure, the computer-readable memory medium may be any tangible medium containing or storing a program that may be used by an instruction executing system, apparatus, or device or used in combination therewith.

Further, in the present disclosure, the computer-readable signal medium may include a data signal propagated in a baseband or as part of a carrier, in which computer-readable program codes are carried. A data signal propagated in such a way may assume a plurality of forms, including, but not limited to, an electromagnetic signal, an optical signal, or any appropriate combination thereof. The computer-readable signal medium may also be any computer-readable medium other than the computer-readable memory medium, which computer-readable medium may send, propagate or transmit the programs used by the instruction executing system, apparatus or device.

The program codes contained on the computer-readable medium may be transmitted using any appropriate medium, including, but not limited to: wireless, wired, cable, RF (Radio Frequency), etc., or any appropriate combination thereof.

Computer readable program instructions for carrying out operations of the present invention may be compiled in one or more programming languages, the programming languages including object-oriented programming languages such as Java, Smalltalk, C++ or the like, as well as conventional procedural programming languages, such as the "C" programming language or similar programming languages. The computer codes may be executed entirely on the user's computer, partially on the user's computer, executed as a stand-alone software package, and partially on the user's computer and partially executed on a remote computer, or entirely executed on the remote computer or server. In a scenario involving a remote computer, the remote computer may be connected to the user's computer through any type of network, including a local area network (LAN) or a wide area network (WAN), or the connection may be made to an external computer (for example, through the Internet using an Internet Service Provider).

An embodiment of the present disclosure further provides another kind of computer-readable memory medium, such that the computer executable instruction stored thereof, when being executed by the computer processor, is for executing the video access method applied to a server, the method mainly comprising:

determining, responsive to a video refresh request sent from a terminal, entrance presentation data of a video-updated user among followed users, and sending the entrance presentation data to the terminal; and sending, responsive to a video data access request directed to any video-updated user as sent by the terminal, video data corresponding to the video data access request to the terminal, wherein the video data access request is acquired by the terminal through a preset operation on the at least one video access entrance presented in the entrance presentation bar displayed on the current terminal interface, and the at least one video access entrance is presented in the entrance presentation bar based on the entrance presentation data.

Of course, the computer executable instruction stored on the memory medium provided by the embodiments of the present disclosure is not limited to the operations in the method, it may also execute the relevant operations of the video access method applicable to at least one of the terminal and server provided by any embodiment of the present disclosure. Introductions on the storage medium may refer to the interpretations in the eighth embodiment above.

I claim:

1. A method of fast accessing videos associated with users followed by a first user, comprising:
   determining the users whom the first user has followed via the users' identity accounts in a video networking community, wherein the networking community comprises a plurality of users, the first user and the users followed by the first user are among the plurality of users;
   automatically receiving, by a terminal associated with the first user, without a request from the first user, data indicating that at least some of the users followed by the first user have updated videos in the video networking community, wherein the terminal comprises a first interface, the first interface is a follow page interface, the follow page interface comprises an area of presenting a first video uploaded by one of the users followed by the first user, and the follow page interface further comprises a profile picture of the one of the users followed by the first user;
   generating a presentation bar based on the received data and displaying the presentation bar overlaid on the first interface, wherein the presentation bar comprises profile pictures of the at least some of the users followed by the first user, and the profile pictures are arranged in the presentation bar in order of time of updating the videos by corresponding users among the users followed by the first user; and
   displaying a second interface in response to receiving a selection of a profile picture among the profile pictures presented in the presentation bar, wherein the second interface presents a second video associated with a user corresponding to the selected profile picture.

2. The method according to claim 1, wherein the presentation bar overlaid on the first interface is displayed in a skylight form.

3. The method according to claim 1, further comprising:
   receiving, by the terminal associated with the first user, data indicating that at least one of the users followed by the first user is broadcasting a live video; and
   wherein the presentation bar further comprises a profile picture of the at least one of the users who is broadcasting the live video.

4. The method according to claim 3, wherein a profile picture of a user having updated a video and a profile picture of a user broadcasting a live video are presented in different forms in the presentation bar based on predetermined rules.

5. The method according to claim 1, further comprising:
   generating a request of refreshing videos based on the first user's dropdown operation on the first interface; and
   sending the request of refreshing videos to a server.

6. A method of fast accessing videos in a networking community comprising a plurality of users, comprising:
   receiving a request of refreshing videos from a terminal associated with a first user, wherein the first user has followed users via the users' identity accounts in the network community, and the first user and the users followed by the first user are among the plurality of users in the video network community;
   determining that at least some of the users followed by the first user have updated videos or are broadcasting live videos in response to receiving the request of refreshing videos;
   automatically sending, without a request from the first user, data associated with the at least some of the users followed by the first user who have updated videos in the video networking community or are broadcasting live videos in the video networking community to the terminal for display of a presentation bar overlaid on an interface of the terminal, wherein the interface is a follow page interface, the follow page interface comprises an area of presenting a first video uploaded by one of the users followed by the first user, the follow page interface further comprises a profile picture of the one of the users followed by the first user, wherein the presentation bar comprises profile pictures of the at least some of the users followed by the first user, and the profile pictures are arranged in the presentation bar in order of time of updating the videos or broadcasting the live videos by corresponding users among the users followed by the first user; and
   in response to receiving information indicative of a selection of a profile picture among the profile pictures by the first user, sending video data associated with a user corresponding to the selected profile picture for display of a video updated by the user or a live video broadcast by the user.

7. The method according to claim 6, further comprising:
   in response to determining that none of the users followed by the first users has updated a video or is broadcasting a live video, send the terminal information indicative of no need of presenting the presentation bar.

8. A terminal of fast accessing videos associated with users followed by a first user, comprising:
   at least one processor; and
   a memory configured for storing at least one program, wherein
   when the at least one program is executed by the at least one processor, the at least one processor is caused to perform operations of:
   determining the users whom the first user has followed via the users' identity accounts in a video networking community, where the video networking community comprises a plurality of users, the first user and the users followed by the first user are among the plurality of users;
   automatically receiving, by a first terminal associated with the first user, without a request from the first user, data indicating that at least some of the users followed by the first user have updated videos in the video networking community, wherein the terminal comprises a first interface, the first interface is a follow page interface, the follow page interface comprises an area of presenting a first video uploaded by one of the users followed by the first user, and the follow page interface further comprises a profile picture of the one of the users followed by the first user;
   generating a presentation bar based on the received data and displaying the presentation bar overlaid on the first interface, wherein the presentation bar comprises profile pictures of the at least some of the users followed by the first user, and the profile pictures are arranged in the presentation bar in order of time of updating the videos by corresponding users among the users followed by the first user; and displaying a second interface in response to receiving a selection of a profile picture among the profile pictures presented in the presentation bar, wherein the second interface presents a second video associated with a user corresponding to the selected profile picture.

9. The terminal according to claim 8, wherein the presentation bar overlaid on the first interface is displayed in a skylight form.

10. The terminal according to claim 8, further comprising:
receiving, by the first terminal associated with the first user, data indicating that at least one of the users followed by the first user is broadcasting a live video; and
wherein the presentation bar further comprises a profile picture of the at least one of the users who is broadcasting the live video.

11. The terminal according to claim 10, wherein a profile picture of a user having updated a video and a profile picture of a user broadcasting a live video are presented in different forms in the presentation bar based on predetermined rules.

12. The terminal according to claim 8, further comprising:
generating a request of refreshing videos based on the first user's dropdown operation on the first interface; and
sending the request of refreshing videos to a server.

13. A server, comprising:
at least one processor; and
a memory configured for storing at least one program, wherein
when the at least one program is executed by the at least one processor, causing the at least one processor to perform operations of claim 6.

14. The server according to claim 13, the operations further comprising:
in response to determining that none of the users followed by the first user has updated a video or is broadcasting a live video, send the terminal information indicative of no need of presenting the presentation bar.

15. A non-transitory computer-readable memory medium on which a computer program is stored, wherein the computer program, when being executed by a processor, implements the method according to claim 1.

16. A non-transitory computer-readable memory medium on which a computer program is stored, wherein the computer program, when being executed by a processor, implements the video access method according to claim 6.

* * * * *